(12) United States Patent
Wood et al.

(10) Patent No.: US 9,193,246 B2
(45) Date of Patent: Nov. 24, 2015

(54) UNIVERSAL REPLACEMENT VENTILATOR LID ASSEMBLY

(71) Applicant: S.A.W. Group, LLC, Burlington, NC (US)

(72) Inventors: Joe K. Wood, Burlington, NC (US); Daniel C. Fuccella, Cary, NC (US); James A. Mathewson, Chapel Hill, NC (US)

(*) Notice: Subject to any disclaimer, the term of this patent is extended or adjusted under 35 U.S.C. 154(b) by 0 days.

(21) Appl. No.: 13/792,839

(22) Filed: Mar. 11, 2013

(65) Prior Publication Data

US 2014/0256243 A1 Sep. 11, 2014

(51) Int. Cl.
*B60H 1/24* (2006.01)
*B23P 19/00* (2006.01)
*B60H 1/26* (2006.01)

(52) U.S. Cl.
CPC .............. *B60H 1/245* (2013.01); *B23P 19/00* (2013.01); *B60H 1/262* (2013.01); *Y10T 29/49826* (2015.01)

(58) Field of Classification Search
CPC ........... F24F 7/02; B60H 1/262; B60H 1/245; B23P 19/00
USPC ........... 454/94, 136, 145, 134, 212, 129, 347, 454/354, 141, 143, 358, 117, 162, 346, 454/349; 49/62; 292/216.03, 217; 296/221, 296/216.02, 217, 223, 222, 224
See application file for complete search history.

(56) References Cited

U.S. PATENT DOCUMENTS

| | | | |
|---|---|---|---|
| 1,480,274 A | | 1/1924 | LaBarre et al. |
| 1,951,534 A | * | 3/1934 | Schwitzer et al. ............ 220/263 |
| 2,137,751 A | | 11/1938 | Davis et al. |
| 2,291,119 A | * | 7/1942 | Thorp ................ B60H 1/00464 248/276.1 |
| 2,328,659 A | | 9/1943 | McKenna et al. |
| 2,337,632 A | * | 12/1943 | Winser .......................... 454/145 |
| 2,702,175 A | * | 2/1955 | Hanin ..................... F24F 13/32 108/93 |
| 3,389,422 A | * | 6/1968 | Glenn ....................... E05F 3/02 16/78 |
| 3,551,917 A | * | 1/1971 | Immega ........................... 4/486 |
| 3,934,383 A | * | 1/1976 | Perry et al. ...................... 52/200 |
| 3,979,148 A | * | 9/1976 | Martin .......................... 296/215 |
| 4,038,911 A | * | 8/1977 | Hart .............................. 454/94 |
| 4,089,557 A | * | 5/1978 | Leiter ........................... 296/221 |
| 4,104,825 A | * | 8/1978 | Hosmer ......................... 49/324 |
| 4,106,399 A | * | 8/1978 | Lawrence, Jr. ................. 454/94 |

(Continued)

OTHER PUBLICATIONS

CIPO Search Report dated Mar. 26, 2015 for Canadian application No. 2845393.

*Primary Examiner* — Alissa Tompkins
*Assistant Examiner* — Anthony Kandare
(74) *Attorney, Agent, or Firm* — NK Patent Law, PLLC (57) ABSTRACT

A universal kit attaching a universal lid thereof to a rooftop structure includes a plurality of mounts and a pair of hinge arms attached to the interior side of the universal lid, and a pair of braces for pivotally attaching distal ends of the hinge arms to the rooftop structure. Each brace has a face for pivotally engaging the mounting hole of one of the hinge arms. The kit includes a plurality of operator brackets, each operator bracket having a respective plurality of fastener holes placed to match particular mounts in the interior side of the universal lid. At least some of the mounts correspond to more than one operator bracket. In a method for attaching a universal lid, the braces are used as templates for forming holes in a rooftop structure. Upon closing the attached lid, the braces are positioned between the roof structure and the universal lid.

6 Claims, 6 Drawing Sheets

(56) References Cited

U.S. PATENT DOCUMENTS

| | | | | |
|---|---|---|---|---|
| 4,119,340 A | * | 10/1978 | Wolfe | 296/215 |
| 4,300,440 A | * | 11/1981 | Holter | 454/78 |
| 4,329,917 A | * | 5/1982 | Fisher et al. | 454/94 |
| 4,395,939 A | * | 8/1983 | Hough et al. | 454/129 |
| 4,415,197 A | * | 11/1983 | Meyer | 296/216.02 |
| 4,594,821 A | * | 6/1986 | Bechtold et al. | 52/72 |
| 4,615,263 A | * | 10/1986 | Titterud | 454/94 |
| 4,633,769 A | * | 1/1987 | Milks | 454/117 |
| 4,650,243 A | * | 3/1987 | Hanley et al. | 296/221 |
| 4,690,040 A | * | 9/1987 | Barnett | 454/136 |
| 4,845,905 A | * | 7/1989 | Frank | 52/72 |
| 4,867,047 A | * | 9/1989 | Citron | 454/347 |
| 4,986,039 A | | 1/1991 | Weisner | |
| 5,020,849 A | * | 6/1991 | Schlapp et al. | 296/221 |
| 5,044,133 A | | 9/1991 | Sampson et al. | |
| 5,054,377 A | * | 10/1991 | Mochel et al. | 454/136 |
| 5,102,185 A | * | 4/1992 | Lake | 296/165 |
| 5,115,601 A | * | 5/1992 | Yamaguchi et al. | 52/1 |
| 5,132,886 A | * | 7/1992 | Hoag et al. | 362/221 |
| 5,148,643 A | | 9/1992 | Sampson et al. | |
| 5,289,615 A | * | 3/1994 | Banks et al. | 16/366 |
| 5,392,562 A | * | 2/1995 | Carambula | 49/346 |
| 5,630,641 A | * | 5/1997 | Mori et al. | 296/224 |
| 5,639,142 A | * | 6/1997 | Willey | 296/217 |
| 6,199,944 B1 | * | 3/2001 | Lee et al. | 296/224 |
| 6,343,833 B1 | * | 2/2002 | Manders | 296/223 |
| 6,390,544 B1 | * | 5/2002 | Manders et al. | 296/223 |
| 6,442,896 B1 | * | 9/2002 | Chapin, III | 49/193 |
| 6,471,286 B1 | * | 10/2002 | Manders et al. | 296/223 |
| 6,494,529 B1 | * | 12/2002 | Manders | 296/222 |
| 6,658,803 B2 | * | 12/2003 | Szyjkowski | 52/213 |
| 6,672,020 B1 | * | 1/2004 | Cermola et al. | 52/200 |
| 6,688,682 B2 | * | 2/2004 | Arthur et al. | 296/216.02 |
| 6,814,387 B2 | * | 11/2004 | Lake | 296/100.06 |
| 6,931,793 B2 | * | 8/2005 | Joyce et al. | 52/20 |
| 7,004,832 B2 | * | 2/2006 | Thomas | 454/94 |
| 7,360,827 B2 | * | 4/2008 | Kinzel | 296/217 |
| 7,731,574 B2 | * | 6/2010 | Milks et al. | 454/94 |
| 8,124,201 B2 | * | 2/2012 | O'Hagan | B29C 51/082 220/62 |
| 8,535,128 B2 | * | 9/2013 | Chwala | 454/354 |
| 8,944,397 B2 | * | 2/2015 | Brown | F24F 13/32 248/274.1 |
| 2002/0170249 A1 | * | 11/2002 | Yulkowski | 52/210 |
| 2008/0034677 A1 | * | 2/2008 | Daniel et al. | 52/72 |
| 2009/0056074 A1 | * | 3/2009 | Chase | 16/321 |
| 2012/0137499 A1 | * | 6/2012 | Agnihotri | 29/462 |

* cited by examiner

UNIVERSAL REPLACEMENT VENTILATOR LID ASSEMBLY

TECHNICAL FIELD

The present disclosure relates to ventilator lid assemblies. More particularly, the present disclosure relates to universal kits and methods by which a variety of rooftop ventilator structures are accommodated by a single universal lid.

BACKGROUND

Recreational vehicles, campers, trailers for transporting livestock, and other mobile and fixed structures have rooftop ventilation assemblies with lids that may be raised to open the assemblies for ventilation and lowered to close the assemblies to trap conditioned air or to protect interior spaces, such as living or work quarters, from outdoor conditions. In an often repeated unfortunate incident, a traveler begins a trip with a raised ventilation lid and the lid is damaged or lost due to high winds during travel or due to contact with trees, hanging signs, or other overhead elements. In other circumstances, ventilation lids become brittle over time by exposure to sun and other natural conditions.

Various makers and various models of ventilation assemblies are available. However, replacement parts compatible with a damaged assembly or remaining rooftop structure may not be readily available at retail locations where only limited supplies, products from a particular manufacturer, or replacement parts for only particular models of ventilation assemblies are in stock.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

According to at least one embodiment, a universal kit is provided for pivotally attaching a universal lid thereof to any one of a plurality of rooftop structures each having a ventilation hole. The universal kit includes a universal lid having a convex exterior side and a concave interior side for facing the ventilation hole, a plurality of mounts connected to the interior side of the universal lid at a plurality of placements, a pair of hinge arms attached to the interior side of the universal lid, each hinge arm having a distal end through which a mounting hole is formed. The universal kit further includes a pair of braces for pivotally attaching the distal ends of the hinge arms to the rooftop structure, each brace having a first portion through which at least one hole is formed for receiving a fastener to fasten the brace to the rooftop structure and a face for pivotally engaging the mounting hole of one of the hinge arms. Also provided is a plurality of operator brackets, each operator bracket having a respective plurality of fastener holes placed to match particular ones of the placements of the mounts, such that at least one of the operator brackets has fastener holes placed differently than at least one other operator bracket. In various examples, at least some of the mounts correspond to more than one operator bracket.

In at least one example, the universal kit also includes hinge pins for pivotally engaging the faces of the braces to the mounting holes of the hinge arms. In that or other examples, each mount may be a pedestal extending from the interior side of the universal lid and having a bore for receiving a fastener to fasten an operator bracket to the pedestal.

In at least one example, the first portion of at least one of the braces includes an elongate portion with a width-reduced central portion, and at least one hole is formed in the elongate portion on each side of the width-reduced portion for receiving a fastener to fasten the brace to the rooftop structure. The face of each brace may lay generally in a plane spaced from and connected to the elongate portion by a double-bend portion of the brace.

In at least one example, the operator brackets include a pair of matched operator brackets essentially equivalently shaped. In at least one example, the universal kit includes a lid hinge bracket having a base strip connected to the universal lid and having two ends each with a respective one of the hinge arms extending therefrom.

In at least one example, the universal lid has a central dome, a planar peripheral base surrounding the central dome, and a skirt extending from the planar peripheral base. The central dome has a convex exterior side and a concave interior side corresponding respectively to the convex exterior side and a concave interior side of the universal lid. In at least one example, the skirt includes three planar walls generally perpendicular to the planar peripheral base, and a fourth planar wall inclined relative to the planar peripheral base to accommodate the rooftop structure through a range of open positions of the universal lid with respect to the ventilation hole. The hinge arms may be inclined relative to the base strip at an angle corresponding to that by which the fourth planar wall of the skirt is inclined relative to the planar peripheral base.

In at least one example, the first portion of at least one of the braces includes a generally planar elongate portion with a width-reduced semi-flexible central portion to provide flexibility such that the universal lid can be attached to any one of a plurality of rooftop structures.

According to at least one other embodiment, a method is provided for pivotally attaching a universal lid to a rooftop structure surrounding a ventilation hole. The method includes providing: a universal lid having a convex exterior side and a concave interior side for facing the ventilation hole; a first hinge arm and a second hinge arm, each attached to the interior side of the universal lid, each having a distal end through which a mounting hole is formed; and a first brace and a second brace each having a first portion through which fastener holes are formed for receiving fasteners to fasten the brace to the rooftop structure and a face for pivotally engaging the mounting hole of one of the hinge arms. The method further includes placing the first brace along a first raised element of the roof structure and forming holes using the first brace as a template, attaching the first brace to the first raised element of the roof structure with fasteners, and positioning the universal lid with the mounting hole of the first hinge arm pivotally engaging the face of the first brace. The second brace is placed along a second raised element of the roof structure and holes are formed using the second brace as a template for forming the holes. The second brace is attached to the second raised element of the roof structure with fasteners with the mounting hole of the second hinge arm pivotally engaging the face of the second brace.

In at least one example, the method includes providing a plurality of mounts connected to the interior side of the universal lid at a plurality of placements, providing a plurality of operator brackets, each operator bracket having a respective plurality of fastener holes placed to match the placements of corresponding mounts, wherein at least one of the operator brackets has fastener holes placed differently than at least one other operator bracket. In that example, the method further includes selecting an operator bracket, placing the selected operator bracket with its fastener holes in alignment with corresponding mounts, attaching the selected operator bracket to the corresponding mounts with fasteners, and engaging an operator arm extending from the ventilation hole to the attached operator bracket.

In at least one example, the method includes closing the universal lid with respect to the ventilation hole by pivoting the universal lid, wherein upon closing the universal lid the first brace is positioned between the first raised element of the roof structure and a portion of the universal lid, and the second brace is positioned between the second raised element of the roof structure and a portion of the universal lid.

This summary is provided to introduce in simplified form a selection of concepts that are further described below in the detailed descriptions. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The foregoing summary and the following detailed descriptions of preferred embodiments are better understood when read in view of the referenced drawings. Exemplary embodiments are shown in the drawings for purposes of illustration. The presently disclosed invention, however, is not limited to the specific methods and instrumentalities disclosed.

DETAILED DESCRIPTIONS

The presently disclosed subject matter now will be described more fully hereinafter with references to the accompanying drawings, in which some, but not all embodiments are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. Although the term "step" may be used herein to connote different aspects of methods employed, the term should not be interpreted as implying any particular order among or between various steps herein disclosed unless and except when the order of individual steps is explicitly described.

Figure 1A:
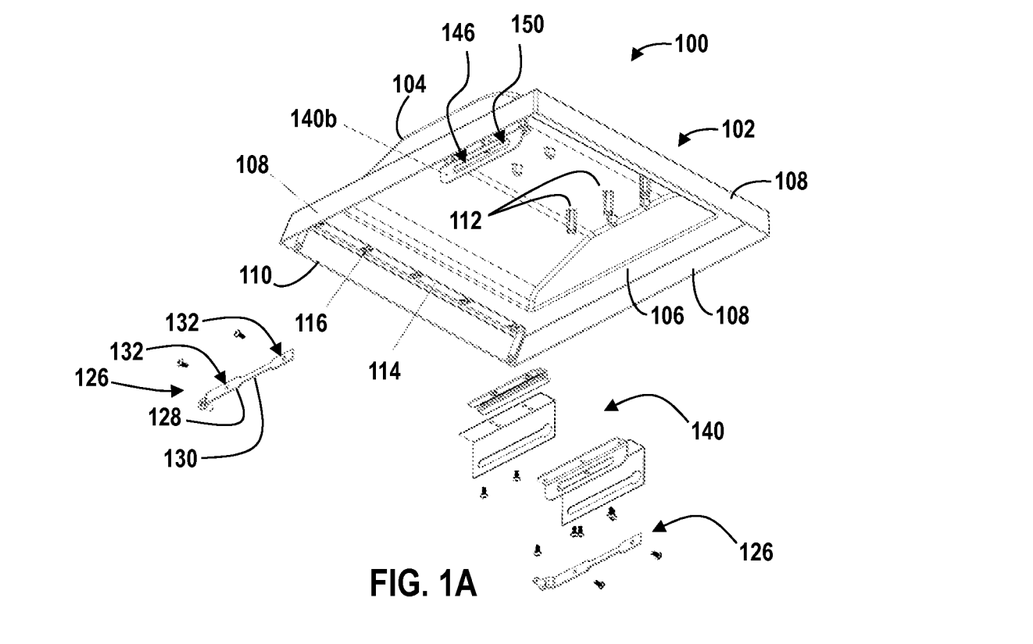
FIG. 1A is a perspective view of an embodiment of a universal kit.
Figure 1B:
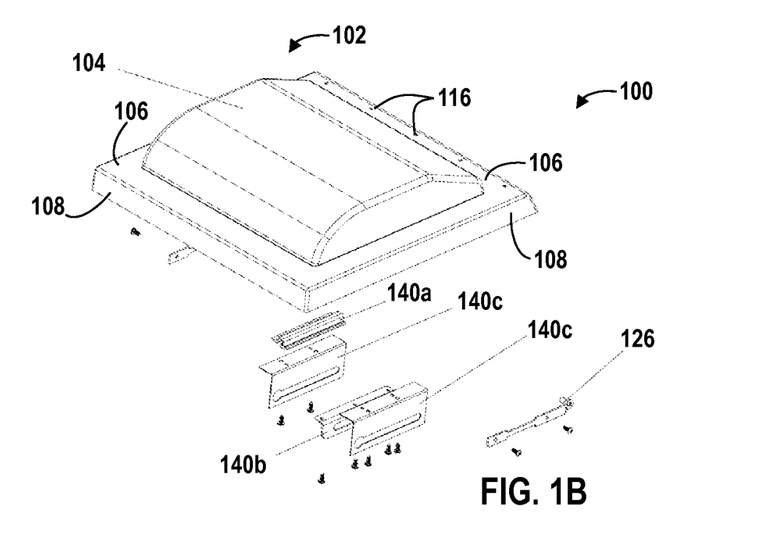
FIG. 1B is another perspective view of the universal kit of FIG. 1A.
Figure 1C:
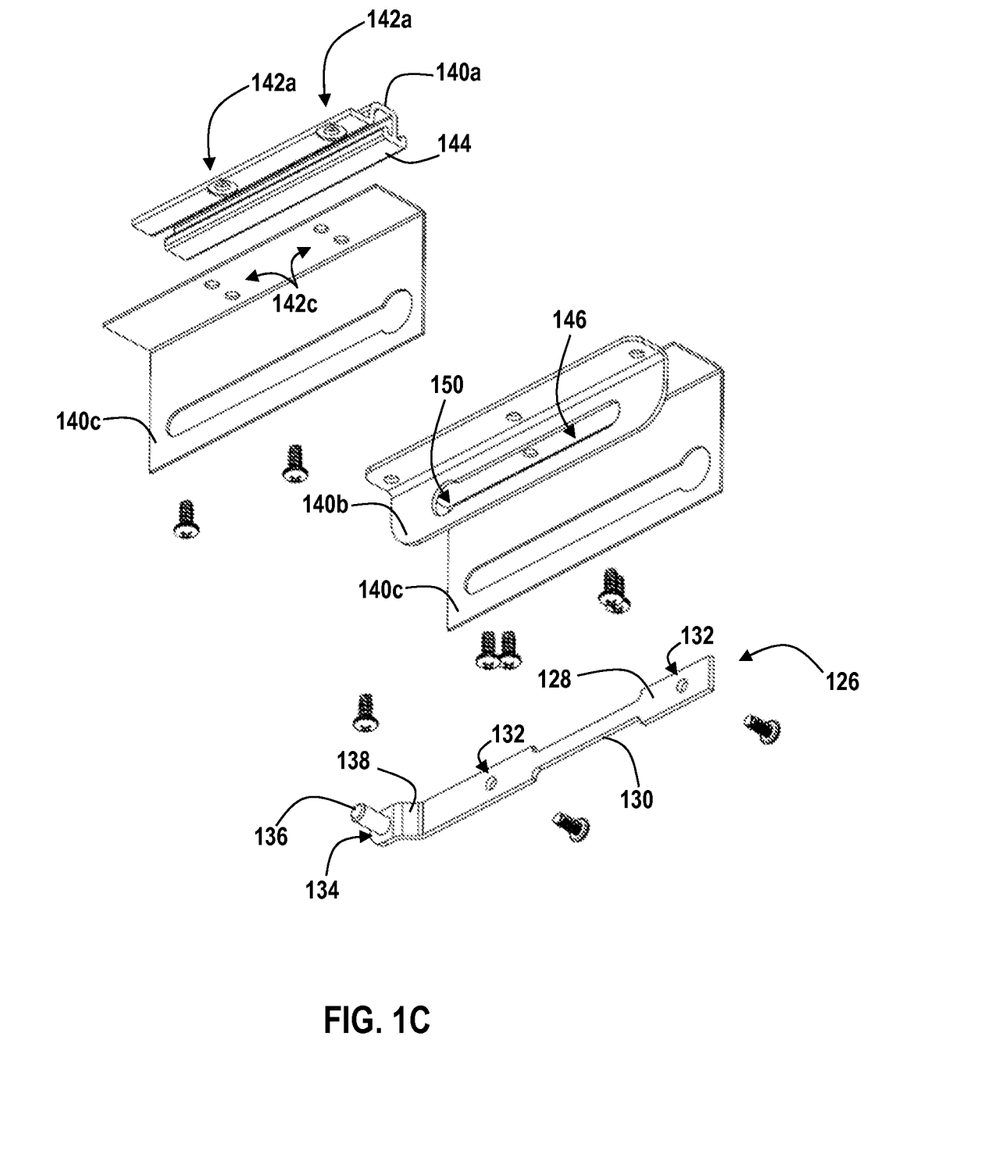
FIG. 1C is a perspective view of particular operator brackets and a brace, all of which are parts of the universal kit of FIG. 1A.
Figure 2:
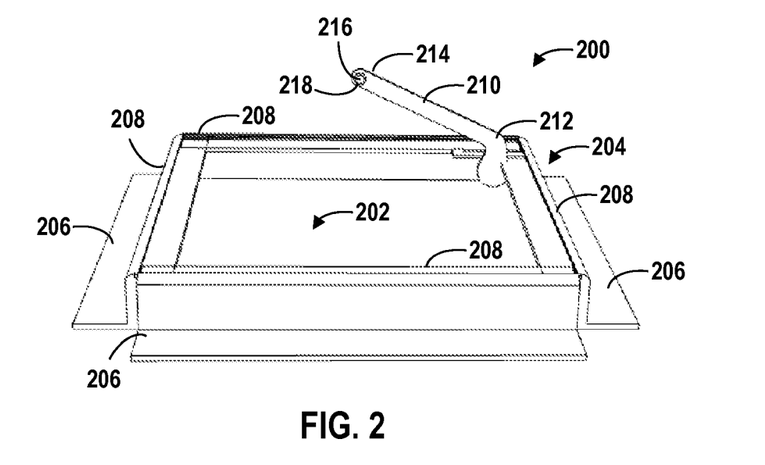
FIG. 2 is a perspective view of an embodiment of a rooftop structure remaining after a ventilation lid has been damaged or lost.

According to at least one embodiment as illustrated in FIGS. 1A-1B, a universal kit 100 including a universal lid 102 is provided by which a missing or damaged ventilator lid is replaced. To better demonstrate the advantages of the universal kit 100, FIG. 2 illustrates a rooftop structure 200 remaining after an unfortunate incident in which a ventilation lid has been damaged or lost. A ventilation opening 202 is defined in a roof above which a flange structure 204 stands around the periphery of the opening. The flange structure 204 may have one or more base elements 206 that lie generally horizontal and flush with the roof and that may be separate or continuous pieces surrounding the ventilation opening 202. Raised elements 208 of the flange structure 204 stand generally vertical and upward from the base elements 206 and, like the base elements, may be separate or continuous pieces. The raised elements 208 extend upward from the base elements 206 and surround the ventilation opening 202. The flange structure 204 typically prevents water and winds directed along the roof from entering the ventilation opening. However, without the benefit of a lid, the interior space below the ventilation opening 202 is exposed to exterior elements such as falling precipitation, unconditioned air, and multi-directional gusts of wind.

A typical rooftop structure has an operator for operating a ventilation lid between closed and open configurations. An operator arm 210 is illustrated in FIG. 2 as extending partially upward from the rooftop structure 200 through the ventilation opening 202. The operator arm 210 has a proximal end 212 attached to a lifting mechanism and a distal end 214 by which the operator arm 210 is connected to a ventilator lid or bracket thereof when such a lid is provided and is in operational condition. The proximal end 212 of the operator arm 210 typically pivots and in some examples travels as the lifting mechanism is controlled or actuated to raise and lower a ventilator lid. A post 216 having a circular head 218 of a diameter enlarged relative to that of the post extends from the distal end 214 of the operator arm 210 as a sliding connector to engage a ventilation lid, which is not illustrated in FIG. 2 according to the scenario represented. It is fairly typical in unfortunate incidents in which ventilation lids are damaged or lost that operator arms and their attached lifting mechanisms are fortunately left intact. Thus, FIG. 2 represents a somewhat typical scenario in which a traveler wishes to replace a lost ventilator lid. According to these descriptions, various makers and various models of ventilation assemblies provide a variety of rooftop structures and variety of operator arms and their attached lifting mechanisms. Thus, FIG. 2 represents many particular arrangements that, for the sake of brevity, are not specifically illustrated or particularly described in detail herein but are nonetheless within the scope of these descriptions.

The universal kit 100 and universal lid 102 thereof advantageously accommodate a variety of rooftop structures and variety of operator arms. The term universal is used herein in the context of such varieties without requiring that every conceivable or physical rooftop structure will be accommodated. As shown in FIGS. 1A-1B, the universal lid 102 has a central dome 104, a planar peripheral base 106 surrounding the central dome, and a skirt 108 extending downward from the base thus defining an interior of the universal lid 102. The central dome 104 has both planar and contoured portions and is generally convex outward from the lid to prevent precipitation from collecting. The base 106 has an inner margin that joins the central dome 104 and an outer margin that joins the skirt 108. The peripheral base 106 and skirt 108 accommodate a variety of flange structures, which are represented as flange structure 204 in FIG. 2. The skirt 108 is illustrated as having four planar walls corresponding to the raised elements 208 of the illustrated flange structure in FIG. 2. In FIGS. 1A-1B, three of the four planar walls of the skirt 108 are generally perpendicular to the planar peripheral base 106 to stand parallel to corresponding raised elements 208 (FIG. 2). A fourth planar wall 110 of the skirt 108 is inclined relative to the planar peripheral base 106 to accommodate a corresponding raised elements 208 (FIG. 2) of the flange structure 204 through a range of open positions of the universal lid 102. See FIGS. 6A-6B for an exemplary illustration of the universal lid 102 pivoted to a raised position.

The height of the skirt 108, as measured from the peripheral base 106, is selected to accommodate many flange structures, which may vary in height. As such, the height of the skirt 108 may be greater than that of some common flange structures. Extending downward from the interior concave side of the dome 104 are several sets of pedestals 112 (see especially FIG. 3) having interior bores for receiving screws. In the illustrated embodiments, at least some of the pedestals 112 are formed as cylindrical posts with central interior bores formed longitudinally and longitudinally extending stiffening ridges integral to the posts. In at least one embodiment, the universal lid 102 a unitary structure such that the dome 104, base 106, skirt 108, and pedestals 112 are of one continuous material or composition. For example, the universal lid 102 may be formed of continuous plastic or may be a composite including fibers and solid fill. The universal lid 102 may be translucent, clear, or colored, and may transmit, block or diffuse light.

A lid hinge bracket 114 (FIG. 1A, FIG. 3) is connected to universal lid 102 along one side of the peripheral base 106 within the interior of the universal lid 102. The lid hinge bracket 114 is illustrated as fixed to the universal lid 102 by rivets 116. The lid hinge bracket 114 has a base strip 120 (FIG. 3) through which holes are formed for receiving the rivets or other fasteners by which the lid hinge bracket 114 is connected to the universal lid 102. A respective lid hinge arm 122 (FIG. 3) extends from the base strip 120 at each end thereof. In the illustrated embodiment, the lid hinge arms 122 are inclined relative to the base strip 120 at an angle corresponding to that by which the fourth planar wall 110 of the skirt 108 is inclined relative to the planar peripheral base 106. Each lid hinge arm 122 has a terminal end in which a mounting hole 124 (FIG. 3-4) is formed to receive respective hinge pins upon assembly as described in further detail in the following. The lid hinge bracket 114 may be a unitary structure constructed of one continuous material or composition, such as steel, aluminum, or other metal or rigid material. In at least one embodiment of the universal kit 100, the lid hinge bracket 114 (FIG. 1A) is provided as connected to the universal lid 102. In other embodiments, further assembly may be required such as attachment of the lid hinge bracket 114 to the universal lid 102.

As illustrated in FIGS. 1A-1C and FIG. 5, a pair of braces 126 is provided for pivotally attaching the lid hinge arms 122 to the rooftop structure of the vehicle or other mobile or fixed structure under repair. Each brace 126 is illustrated as having a planar elongate portion 128 with a width-reduced central portion 130 serving as a semi-flexible portion of the elongate portion. Fastener holes 132 are defined in the elongate portion 128 of each brace 126 on opposing sides of the width-reduced portion 130 for receiving fasteners such as screws by which the braces are to be attached to the raised elements 208 of the rooftop structure under repair as shown for example in FIGS. 6A-6B. The width-reduced central portions 130 of the braces permit some degree of flexibility in two dimensions to accommodate unpredictably damaged or otherwise contoured rooftop structures. Each brace 126 has a pin-retaining face 134 at one end of the brace for retaining a respective hinge pin 136. The pin-retaining face 134 lies generally in a plane spaced from and connected to the generally planar elongate portion 128 by a double-bend portion 138 of the brace.

Each hinge pin 136 has a diameter sized to be received by a mounting hole 124 of the lid hinge bracket 114 (FIG. 1A) while permitting relative rotation of the hinge pin 136 within the mounting hole 124 to permit opening and closing of the universal lid 102 once assembled. The braces 126 are shown as connected to the lid hinge bracket 114 in FIG. 5, which does not include the universal lid to provide a clear illustration of the connection and various parts of the braces 126, despite that the lid hinge bracket 114 is provided as connected to the universal lid 102 in at least one embodiment of a universal kit 100 described herein.

With regard to each brace 126, a hinge pin 136 is retained by the pin-retaining face 130 and extends perpendicularly from the pin-retaining face 130 along the normal thereof. The hinge pin 136 extends from the pin-retaining face 134 in the same direction as that in which the pin-retaining face 134 is spaced from the generally planar elongate portion 128. Thus, the reach of the brace 126 and hinge pin 136 in the normal direction with respect to the generally planar elongate portion 128 of the brace 126 is additive.

Figure 3:
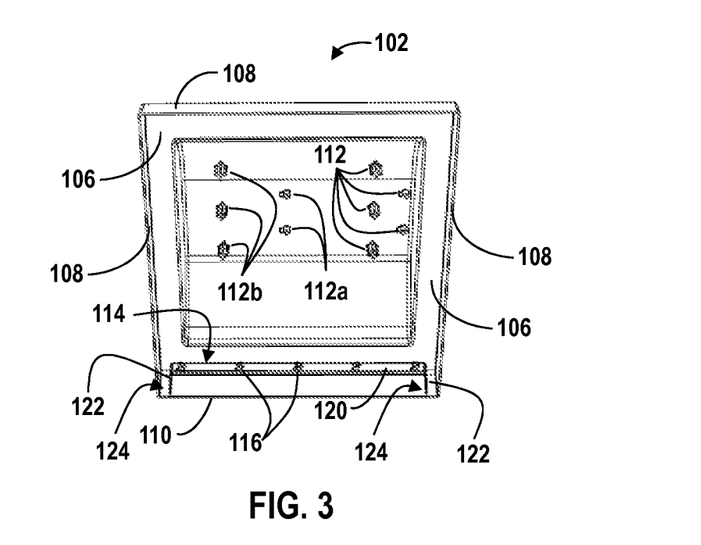
FIG. 3 is a perspective view of the universal lid of FIG. 1A.
Figure 4:
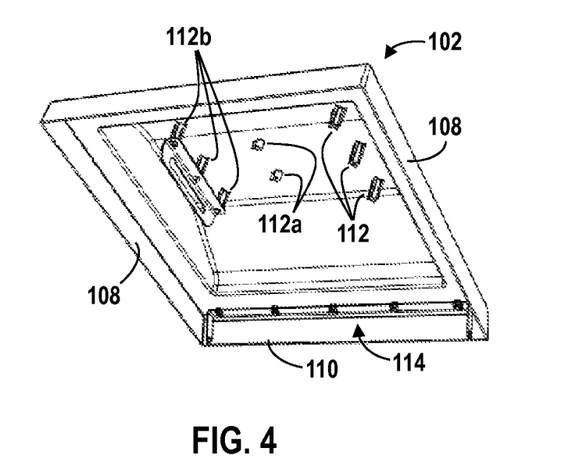
FIG. 4 is a perspective view of the universal kit of FIG. 1A in a state of at least partial assembly.

Several operator brackets 140 (FIG. 1A) are illustrated corresponding to the several sets of pedestals 112. The operator brackets 140 have respective fastener holes placed to match the placements of the pedestals 112 to which they correspond, such that the brackets can be attached to the to the interior of the universal lid 102 by way of the pedestals using fasteners such as screws. Thus, the pedestals serve as mounts for the operator brackets. For example, a first operator bracket 140a (FIG. 1C) has first fastener holes 142a corresponding to two generally central pedestals 112a (FIG. 3). A second operator bracket 140b (FIG. 1A) corresponds to three generally non-central pedestals 112b (FIG. 3). A variety of operator brackets 140a-c (FIG. 1C) are provided in order to facilitate the operational coupling of the universal lid 102 to a variety of operator arms, one of which is illustrated as an exemplary operator arm 210 in FIG. 2. In accordance with the example of FIG. 2, the second operator bracket 140b is mounted to the universal lid 102 in FIG. 1A and FIG. 4. The second operator bracket 140b is provided as one of a pair of operator brackets 140b by which the illustrated operator arm 210 and other operator arms, some of which may occur in pairs, are accommodated.

Another pair of operator brackets 140c corresponds to other non-central pedestals 112. Operator brackets 140c have holes 142c (FIG. 1C) placed accordingly for receiving fasteners such as screws by which the operator brackets are to be mounted to pedestals. The operator brackets 140c are essentially equivalently shaped. At least one of the operator brackets corresponds to the same mounts to which another of the plurality of operator brackets corresponds, such that at least some of the mounts correspond to more than one operator bracket. For example, at least one of the matched operator brackets 142c corresponds to the same pedestals 112a to which the first operator bracket 140a corresponds, such that at least some of the central pedestals 112a correspond to more than one operator bracket.

The various operator brackets 140, individually or in pairs, are shaped to engage respective operator arms 210 or connectors attached thereto, according to various models of such arms, to link the universal lid 102 to the particular lifting mechanism of the vehicle or other mobile or fixed structure under repair. For example, the post 216 having the circular head 218 serves as a particular type of connector in FIG. 2, and others are within the scope of these descriptions. For further example, the first operator bracket 140a has a rail for receiving a particular type of a sliding connector attached to a particular type of operator arm. The rail engages the sliding connector while allowing pivoting motion of the operator arm. Such movement of the operator arm facilitates opening and closing of the universal lid 102 by operation of the lifting mechanism of a vehicle or other mobile or fixed structure repaired by the universal kit 100 particularly using the first operator bracket 140a.

The second operator bracket 140b is shaped as an L-channel member defined by two planar members, one of which is mounted to the universal lid 102 by screws, and the other of which has formed therethrough a linear slot 146 (FIG. 1A, 1C) for accommodating the post 216 of the connector at the distal end 214 of the operator arm 210 such as that illustrated in FIG. 2. A clearance hole 150 (FIG. 1A, 1C), enlarged relative to the slot 146, is formed at one end of the slot to permit passage of the circular head 218 (FIG. 2) of the connector when the distal end of the operator arm 210 is to be engaged by the second operator bracket 140b while allowing pivoting and sliding motion of the operator arm 210 to permit opening and closing of the universal lid 102. The operator brackets 140c can be similarly described.

According to these descriptions and drawings, a variety of operator brackets corresponding to a variety of rooftop structures and a variety of operator arms and their attached lifting mechanisms are provided for the convenience of a traveler or repairman. For example: operator bracket 140a may accommodate one or more products by Ventadome; operator brackets 140b may accommodate one or more products by Maxxair, and one or more products by Comfort Air; and operator brackets 140c may accommodate one or more products by Jensen, one or more products by Ventline, and one or more products by Create-a-breeze; all of which names may be under registered trademark protection.

Figure 7:
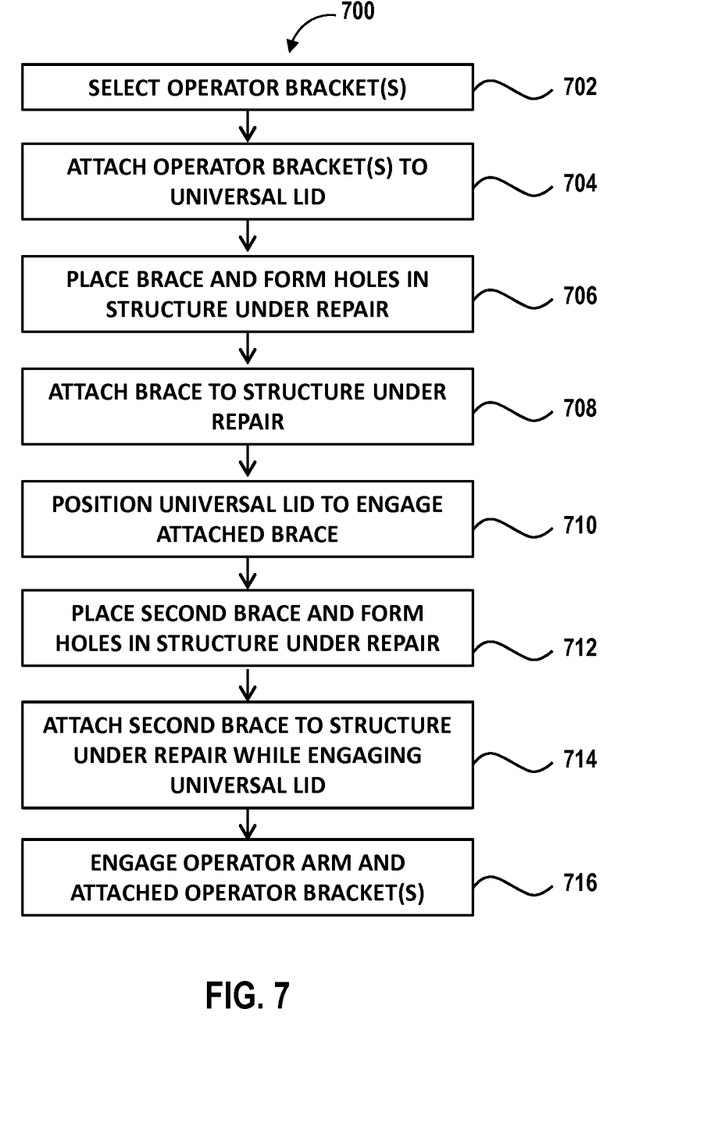
FIG. 7 is a flowchart representing an embodiment of a method of pivotally attaching a universal lid to a rooftop structure surrounding a ventilation hole.

Having generally described many of the particular components of the universal kit 100 (FIG. 1) and rooftop structure 200 (FIG. 2) in need of repair, a method 700 of pivotally attaching a universal lid to a rooftop structure surrounding a ventilation hole is described in the following with reference to a corresponding flowchart in FIG. 7. In these descriptions, references are made to particular components of the universal kit 100 and the rooftop structure illustrated in the other drawings for purposes example without limitation of the method 700 to such exemplary particular components.

In step 702, one or more particular operator brackets 140 are selected from the universal kit 100 according to the particular operator arm, such as operator arm 210 for example, remaining as extended from the rooftop structure in need of repair. In step 704, each selected operator bracket is placed with at least one screw hole in alignment with a corresponding pedestal 112 within the interior of the universal lid 102, and the selected bracket is attached to the pedestal by at least one screw. In the illustrated embodiments, each operator bracket 140 has multiple fastener holes for firm attachment to the universal lid 102. For purposes of demonstration, FIG. 1A illustrates the second operator bracket 140b mounted to the universal lid 102. In other examples according to steps 702 and 704 (FIG. 7), other operator brackets are selected and attached.

In step 706, one of the two braces 126 (FIG. 1A, FIG. 5) is placed along a raised element 208 (FIG. 2) of a roof structure in need of repair and holes are drilled or otherwise formed in the raised element 208 at positions corresponding to the fastener holes 132 in the placed brace. Thus, the brace is utilized as a template by which holes are placed in the raised element 208 for attaching the brace 126 to the rooftop structure under repair. The brace 126 is placed to extend the hinge pin 136 from an end of the raised element 206 to define a hinge point for the universal lid 102.

In step 708, the brace 126 is attached to the rooftop structure by screws or other fasteners such as, for example, bolts and rivets. In step 710, the universal lid 102 is positioned with its interior facing into the ventilation opening 202 (FIG. 2), with the lid hinge bracket 114 (FIG. 1A) carried by the universal lid 102. The universal lid 102 is positioned to pass the hinge pin 136 of the attached brace 126 through a first mounting hole 124 of the lid hinge bracket 114 to thereby pivotally engage a first side of the universal lid 102.

In step 712, the other of the two braces (FIG. 1A, FIG. 5), a second brace 126 with respect to the first brace 126 placed in step 706, is placed along a raised element 206 (FIG. 2) such that the two braces extend their hinge pins 136 toward each other along a common axis which will define the pivoting axis of the universal lid 102. As in step 706, the second brace 126 is utilized as a template by which holes are placed in the raised element 206 for attaching the brace 126 to the rooftop structure under repair.

Figure 5:
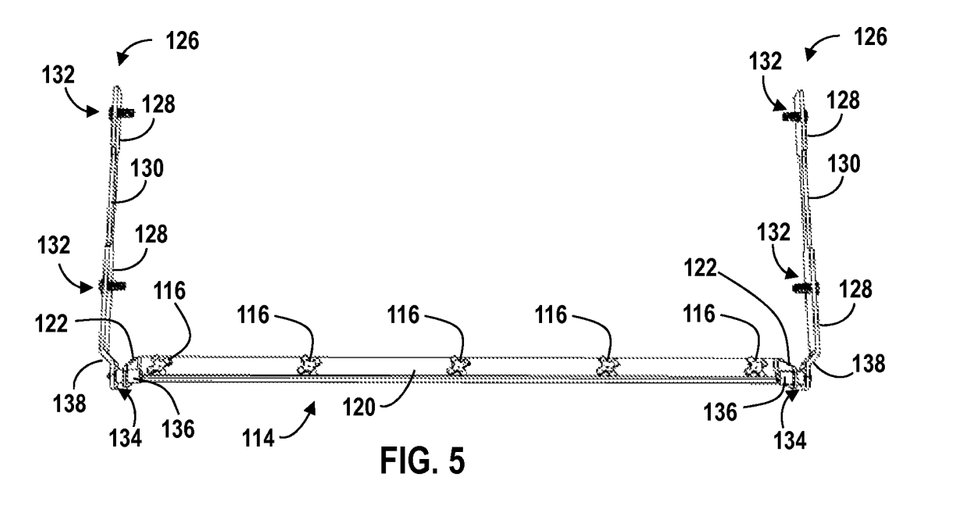
FIG. 5 is a perspective view of hinge and brace components of the universal kit of FIG. 1A.
Figure 6A:
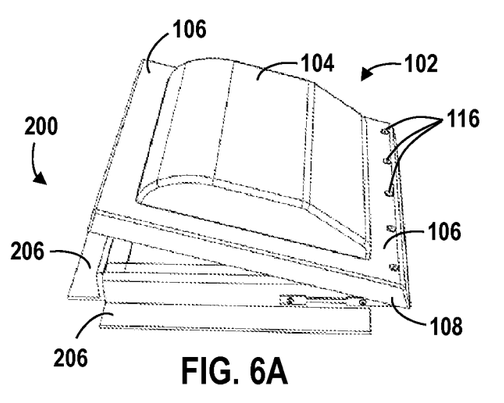
FIG. 6A is a perspective view of the rooftop structure of FIG. 2, repaired by the universal kit of FIG. 1A.
Figure 6B:
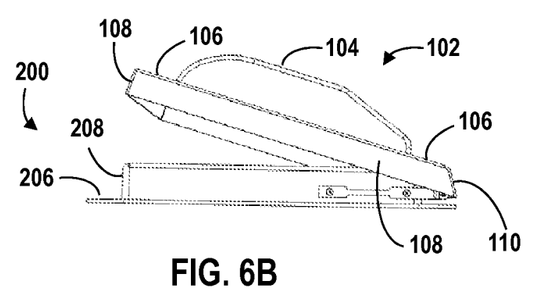
FIG. 6B is another perspective view of the rooftop structure of FIG. 2, repaired by the universal kit of FIG. 1A.

In step 714, the second brace 126 is attached to the rooftop structure by screws or other fasteners while assuring that the hinge pin 136 thereof passes through the second mounting hole 124 of the lid hinge bracket 114 to thereby pivotally engage a second side of the universal lid 102. In step 714, the second brace 126 to be attached approaches the universal lid 102 in the same direction as that along which the universal lid 102 approaches to engage the first brace 126 in step 710. By attachment of the second brace 126 to the rooftop, the lid hinge bracket 114, with the universal lid 102 attached thereto, is trapped between the pin-retaining faces 134 of the braces 126 (FIG. 5). This pivotally engages the universal lid 102 to the rooftop structure as shown in FIGS. 6A-6B.

In step 716, the operator arm remaining extended from the rooftop structure is engaged with the operator bracket attached to the universal lid 102 in step 704. This permits opening by lifting and closing by lowering of the universal lid 102 by operation of a lift mechanism of the repaired rooftop structure. For purposes of demonstration, FIG. 2 particularly illustrates an operator arm 210 for engagement with the second operator bracket 140b, while other operator arms and operator brackets are within the scope of these descriptions.

In a fully closed position of the universal lid 102, the skirt 108 surrounds the raised elements 208 of the flange structure 202 with the braces 126 and lid hinge bracket 114 residing between the repaired roof structure and the universal lid 102. This protects the braces 126 and lid hinge bracket 114 from outdoor elements and returns the overall look of the repaired roof structure to a condition similar to new condition. Operator arms and other linkages hinging or otherwise that are a part of an original roof structure typically reside below the original lid with no parts thereof between the lid and the raised elements 208 of the flange structure 204. Advantages of the universal kit 100 are derived at least in part from the dimensions of the skirt 108 of the universal lid 102, in some cases defining a footprint area along the rooftop greater than corresponding original equipment. By providing space to accommodate the braces 126 (FIGS. 5, 6A-6B) and lid hinge bracket 114 (FIG. 4) between the skirt 108 and raised elements 208 of the roof top structure, the repair in some cases can be completed without entering the interior space below the ventilation opening 202 (FIG. 2). Thus great convenience is advantageously achieved at least with regard to universal utility in repairing damaged ventilation structures and with regard to convenience during repair operations.

While various embodiments have been expressly described above with references to the drawings, which illustrate exemplary features, it is to be understood that other similar embodiments may be used or modifications and additions may be made to the described embodiments for performing the same functions without deviating therefrom. Therefore, the disclosed embodiments should not be limited to any single embodiment, but rather should be construed in breadth and scope in accordance with the appended claims.

What is claimed is:

1. A universal kit for providing a universal lid and for pivotally attaching the universal lid to any one of a plurality of rooftop structures each having a ventilation hole and a support frame extending from a rooftop, the universal kit comprising:
   a universal lid having a first grouping of pedestals and a second grouping of pedestals extending therefrom towards the rooftop when the lid is installed about the rooftop, the first grouping of pedestals being configured to engage a selected first operator bracket and the second grouping of pedestals being configured to engage a selected second operator bracket, the pedestals each defining an elongate protrusion extending from a bottom facing surface of the lid, wherein the first grouping of pedestals is spaced-apart from the second grouping of pedestals, wherein adjacent pedestals in the first grouping of pedestals have a different spacing therebetween than adjacent pedestals in the second grouping of pedestals, wherein the selected first operator bracket does not have the same shape as the selected second operator bracket;
   a first hinge arm positioned in a spacing defined between the universal lid and the support frame and secured to a first outer facing flange of the support frame;
   a second hinge arm positioned in a spacing defined between the universal lid and the support frame and secured to a second outer facing flange of the support frame;
   a base strip secured to a length of an underside of the universal lid, the base strip being pivotably attached on a first end thereof to the first hinge arm and attached on a second end thereof to the second hinge arm, the base strip and the first hinge arm and the second hinge arm cooperating to provide pivoting of the universal lid relative to the support frame,
   wherein an installer selects one of the first and second operator brackets to accommodate an existing operator arm and engages the selected one of the first and second operator brackets with a matching one of the first grouping of pedestals and the second grouping of pedestals.

2. A universal kit according to claim 1, wherein at least one of the selected operator brackets defines a plurality of apertures that corresponds to one of the first or second grouping of pedestals such that the pedestals are received within the apertures of the selected operator bracket.

3. A universal kit according to claim 1, wherein the universal lid comprises:
   a central dome having a convex exterior side and a concave interior side corresponding respectively to the convex exterior side and a concave interior side of the universal lid;
   a planar peripheral base surrounding the central dome; and
   a skirt extending from the planar peripheral base.

4. A universal kit according to claim 3, wherein the skirt comprises:
   three planar walls generally perpendicular to the planar peripheral base; and
   a fourth planar wall inclined relative to the planar peripheral base to accommodate the rooftop structure through a range of open positions of the universal lid with respect to the ventilation hole.

5. A universal kit according to claim 4, wherein the first hinge arm and second hinge arm are inclined relative to the base strip at an angle corresponding to that by which the fourth planar wall of the skirt is inclined relative to the planar peripheral base.

6. The universal kit according to claim 1, wherein each pedestal defines a bore and a threaded fastener is extended through an aperture of the selected operator bracket into the bore to secure the selected operator bracket to the pedestals.

* * * * *